United States Patent [19]

Hutsell

[11] Patent Number: 5,466,999
[45] Date of Patent: Nov. 14, 1995

[54] SPINDLE MOTOR START CONTROL PROCESS AND APPARATUS

[75] Inventor: Larry Hutsell, Longmont, Colo.

[73] Assignee: Maxtor Corporation, San Jose, Calif.

[21] Appl. No.: 290,370

[22] Filed: Aug. 15, 1994

[51] Int. Cl.⁶ .................................................. H02P 6/20
[52] U.S. Cl. ........................... 318/431; 318/439; 318/459; 318/254
[58] Field of Search .................................. 318/138, 254, 318/430, 431, 439, 459

[56] References Cited

U.S. PATENT DOCUMENTS

| | | | |
|---|---|---|---|
| 4,264,853 | 4/1981 | Morishita | 318/805 |
| 4,835,448 | 5/1989 | Dishner et al. | 318/254 |
| 5,298,838 | 3/1994 | Peters et al. | 318/138 |
| 5,298,839 | 3/1994 | Takeda | 318/254 |

*Primary Examiner*—Bentsu Ro
*Attorney, Agent, or Firm*—Sheridan Ross & McIntosh

[57] ABSTRACT

A method for starting spin-up of a spindle motor in a hard disk drive. When power is initially applied to the spindle motor, the spindle motor is set to a first commutation state. The spindle motor is maintained in this first commutation state for a pre-determined period of time to allow the spindle motor to reach a known null point. Thereupon, the spindle motor is advanced to a second commutation state. The spindle motor is then maintained at this second commutation state for another pre-determined period of time. Finally, the spindle motor is advanced two successive commutation states to a peak torque curve. Once the spindle motor has started spinning, the commutation process is controlled according to the sensed back EMF voltage being generated in the off-phase.

15 Claims, 5 Drawing Sheets

5,466,999

SPINDLE MOTOR START CONTROL PROCESS AND APPARATUS

FIELD OF THE INVENTION

The present invention pertains to the field of three-phase motors. More particularly, the present invention relates to an apparatus and control process for starting a spindle motor in hard disk drives.

BACKGROUND OF THE INVENTION

Magnetic recording devices, such as hard disk drives, are popularly used for the storage and retrieval of digital data because of their high capacity, low cost, and random access capability. In a hard disk drive, the digital data received from a computer is processed, encoded, and then written onto a circular, rigid disk. This disk is spun about a spindle by a spindle motor. As the disk is spun, the drive's servomechanism positions a transducer across the surface of the disk. Hence, the digital data is stored magnetically in a number of concentric circles, known as "tracks". Often, a number of disks are stacked together and accessed by a plurality of transducers. The same transducer can be used to both write data to the disk as well as read the data from the disk.

Whenever the computer is initially turned on, the spindle motor is "spun-up" (i.e., the spindle motor starts rotating the disk). The spinning disk creates a cushion of air, upon which the transducer can "fly" across the surface of a disk when moved from a starting track to a destination track (i.e., a "seek"). Usually, the spinning of the disk is maintained as long as the computer is turned on. However, disk drives for laptop and notebook computers are typically shut down after a period of non-use, in order to conserve power. When the disk drive is next accessed, the spindle motor is then spun-up.

Typically, the spindle motor is comprised of a three-phase motor. One problem inherent with three-phase motors is that of alignment. A three-phase motor is comprised of a rotating electromagnet and a permanent, stationary magnet. These magnets should be electrically and mechanically aligned. Otherwise, if these magnets were not properly aligned, the maximum torque would not be achieved. Indeed, improper alignment might even result in the spindle motor spinning backwards. Furthermore, there is a possibility that when current is first applied, the three-phase motor is near an unstable null torque position and, therefore, might not be able to move. This problem is exacerbated by the presence of friction.

In the prior art, these start-up problems inherent to three-phase motors were handled by using Hall effect devices to provide positional feedback information. And depending on the sensed information, the correct commutation state can then be activated. Three Hall effect devices were required-one for each of the three phases. The problems associated with adapting these Hall effect devices to spindle motor applications were cost, reliability, and size. These devices are quite costly and are subject to failures. Moreover, incorporating these devices consume a lot of printed circuit board space (which is critical for laptop, notebook, and hand-held computer systems). Another approach involved the use of separate, dedicated hardware to perform the start-up functions. Again, incorporating additional components was not cost effective, was subject to breakage, and wasted valuable space.

Thus, there is a need in the prior art for a fast, efficient, reliable, and inexpensive spindle start-up process. It would be preferable if such a process could be implemented without requiring additional hardware.

SUMMARY OF THE INVENTION

The present invention pertains to an apparatus and method for the start-up of a spindle motor of a hard disk drive. In the present invention, a processor is used to commutate the three-phase spindle motor during start-up. The start-up process consists of two alignment states, followed by two immediate commutation pulses to bring the commutation state to the correct place relative to the motor position. Next, a string of commutation pulses, with decreasing time between the pulses, is used to bring the motor up the speed curve. The decreasing time between commutation pulses is based on the applied start current, the corresponding motor acceleration and the number of motor poles.

A three phase motor has six commutation states per pole pair. The six states area; AC, BC, BA, CA, CB and AB. If the motor is held in one commutation state, as it is rotated through 360 electrical degrees, the developed torque will appear sinusoidal and go from a stable null torque location to a positive peak location, then to an unstable null torque location, then to a negative peak torque location and then back to the stable null torque location. When power is first applied in one of the six commutation states, the motor is in an unknown location. If the power is applied without advancing the commutate state machine, the motor will align itself to a stable null torque location. Once this alignment is complete, the motor is in a known position and commutations can be advanced in a known fashion.

However, there is a possibility that when the current is first applied, the motor is near an unstable null torque position and, because of friction, is unable to move. This is the reason why the second alignment state is applied. If the motor is near a null torque location in one commutation state and is unable to move, advancing to the next commutation state puts the motor near a peak torque location. This will initiate the motor moving towards a stable null torque position. Once the motor is aligned to a stable null torque location, the commutation state machine is immediately advanced forward two states to bring the motor to its proper point on the three phase torque curves. Once the commutation state machine is aligned to the motor position, the motor begins accelerating in the correct direction. As the motor rotates, the commutations is advanced to keep the motor on the peak torque curves. The scheduling of these commutation advancements are based on the applied start current, the corresponding motor acceleration and the number of motor poles. In the currently preferred embodiment, once the motor has reached 5% to 10% of the final speed, the motor's back electromotive force (EMF) signal is large enough to handle the commutation control.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A spindle motor start-up process and apparatus is described. In the following description, for purposes of explanation, numerous specific details are set forth, such as commutation states, time delays, back electromotive force, phases, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

Figure 1:
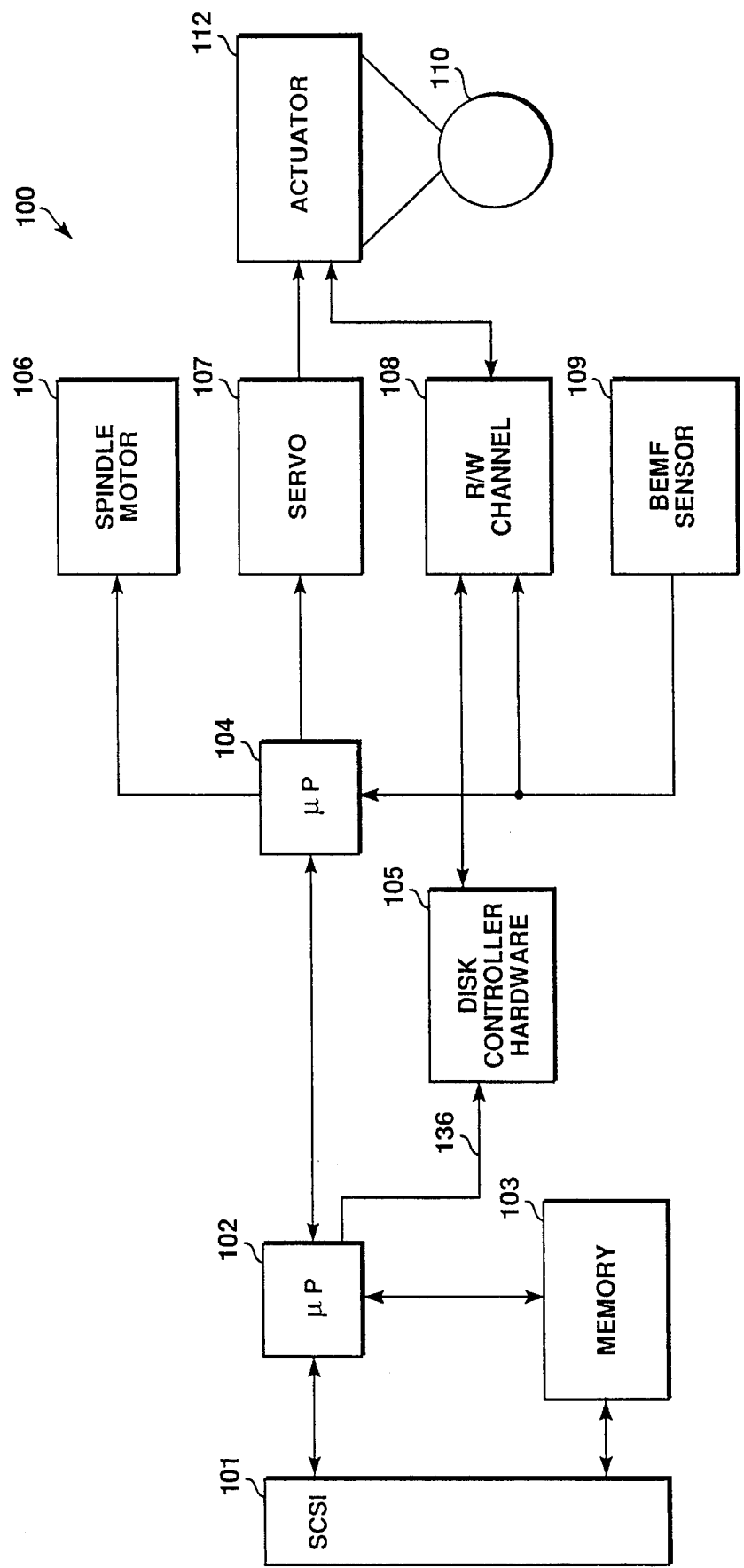
FIG. 1 shows a block diagram of a hard disk drive system upon which the present invention may be practiced.

Referring to FIG. 1, a block diagram of a hard disk drive system upon which the present invention may be practiced is shown. The hard disk drive system 100 is comprised of a SCSI interface 101 which provides an interface between the disk drive system 100 and external instrumentation, usually a computer. The SCSI interface 101 is coupled to a controller microprocessor 102 and to memory 103. Controller microprocessor 102 communicates with microprocessor 104 and instructs it per a program stored in memory 103. Controller microprocessor 102 is also coupled to disk controller hardware 105. Disk controller hardware 105 receives data signals read from the disk 110 via read/write channel 108 and converts it into a byte format. Likewise, when data is written via read/write channel 108, disk controller hardware 105 converts the data into a format compatible for storing on disk 110.

Microprocessor 104 controls the spindle motor 106, servo mechanism 107, and read/write channel 108. Spindle motor 106 spins disk 110, and servo mechanism 107 controls the movement of the actuator 112 in order to access each of the tracks on disk 110. Read/write channel 108 passes the signals read from and written to disk 110.

The steps for controlling the start-up process of spindle motor 106 is stored as code in memory 103. Memory 103 can be comprised of ROM, RAM, PROM, or FLASH memory. Specifically, processor 104 controls the commutation states of spindle motor 106 when power is first applied according to the start-up process stored in memory 103. Once spindle motor 106 is already rotating, processor 104 controls the commutation of spindle motor 106 according to the BEMF voltage signal generated by the BEMF sensor 109.

Figure 2:
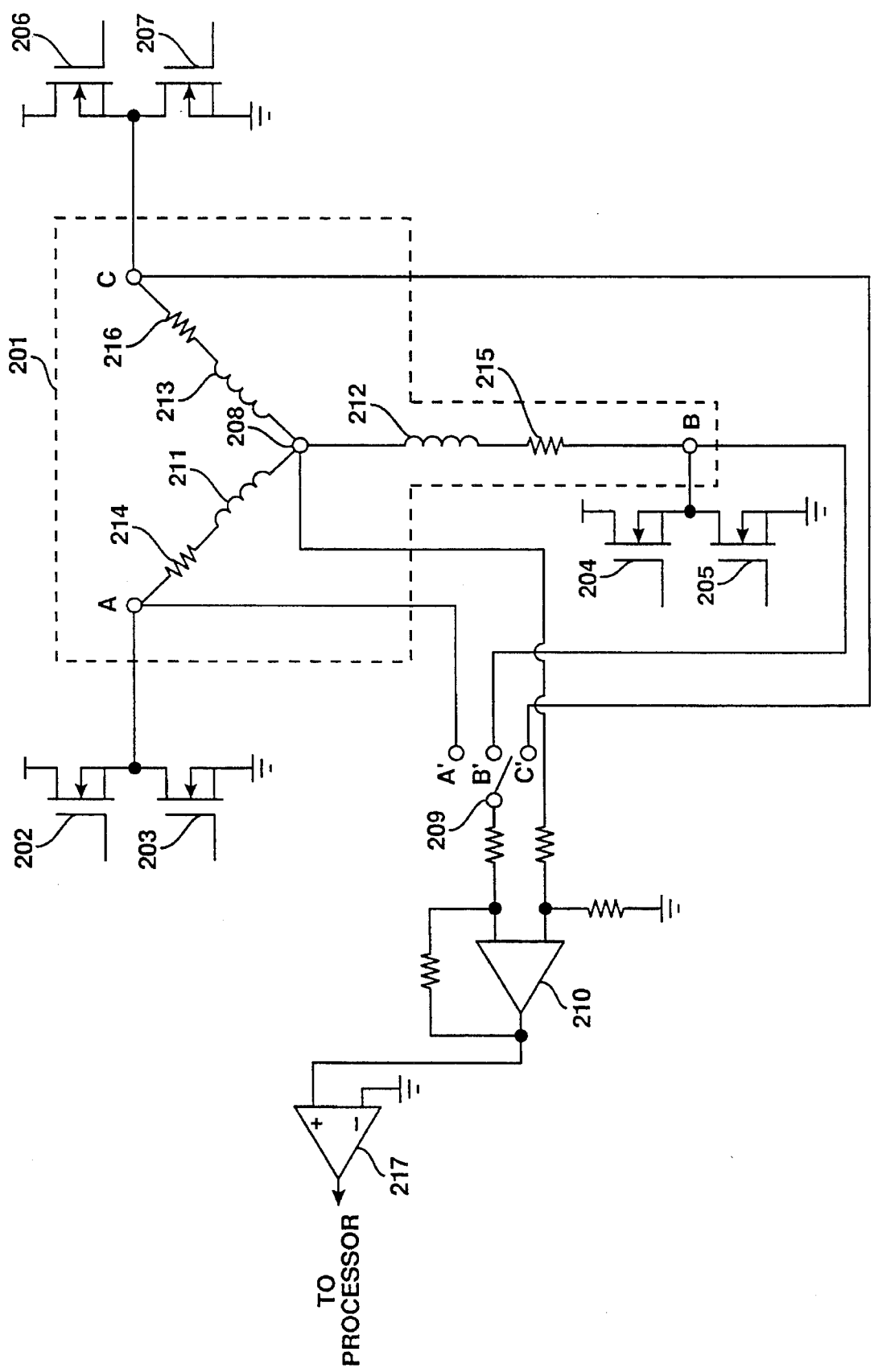
FIG. 2 shows a circuit diagram representation of the three-phase spindle motor and the back electromotive force (BEMF) sensor.

FIG. 2 shows a circuit diagram representation of the three-phase spindle motor 201 and the back electromagnetic force (BEMF) sensor. The three-phase motor 201 is represented by the three terminals A–C, inductors 211–213, and resistors 214–216. The center-tap of the three phase motor 201 is represented by node 208. The three-phase motor 201 has six commutation states per pole pair. These six states are: AC, BC, BA, CA, CB, and AB. Six transistors 202–207 are used to provide the current to drive motor 201. Specifically, transistors 202 and 203 drive terminal A; transistors 204 and 205 drive terminal B; and transistors 206 and 207 drive terminal C. By varying the current supplied to each of these terminals, the spindle motor is caused to rotate.

As the motor rotates, a BEMF voltage is generated by the off-phase terminal. This BEMF voltage is sensed by the negative feedback amplifier 210. The output of amplifier 210 is then connected to the input of a voltage comparator 217 to generate a square wave where the edges of the square wave correspond to the zero crossings. The square wave is then sent to the processor and used as processor interrupts. Depending on the particular commutation state that motor 201 is currently in, switch 209 couples the input signal of amplifier 210 to the appropriate off-phase terminal. For example, if the commutation state were AC, switch 209 would connect the B' terminal to the input of amplifier 210. When motor 201 changes to the next commutation state, BC, switch 209 connects the A' terminal to the input of amplifier 210. In this manner, the phase to center-tap BEMF voltage is accurately measured.

Figure 3B:
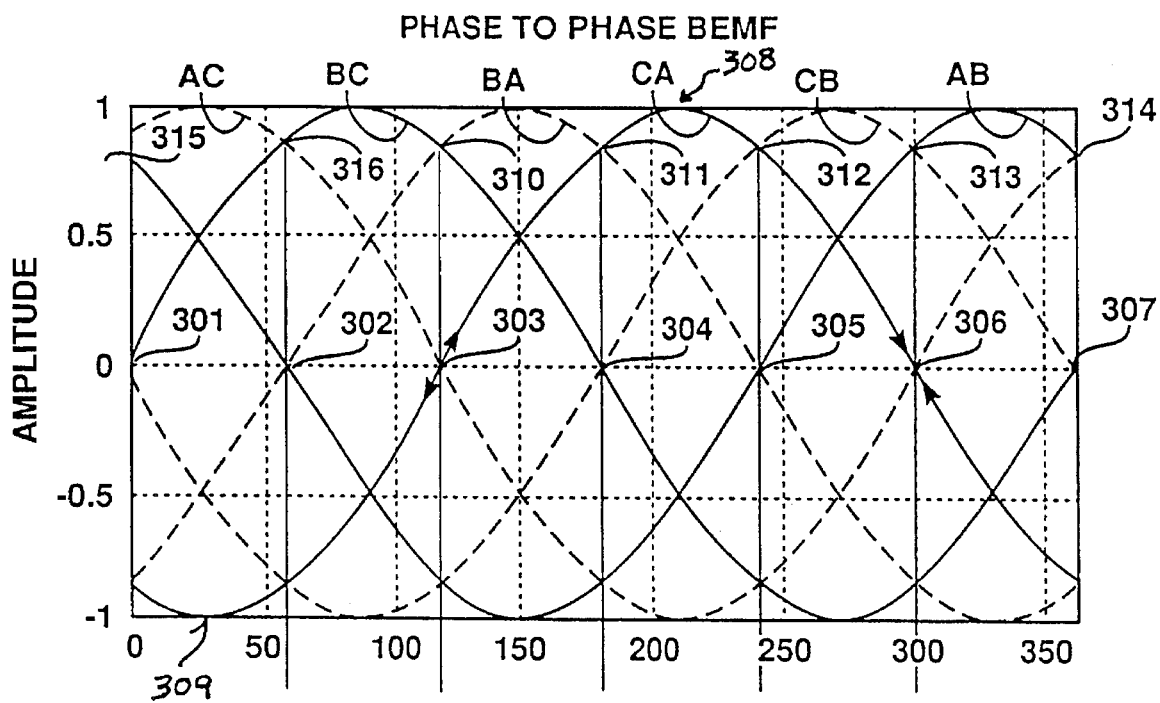
FIG. 3B shows the waveforms corresponding to the phase to phase BEMF as a function of electrical degrees.
Figure 3A:
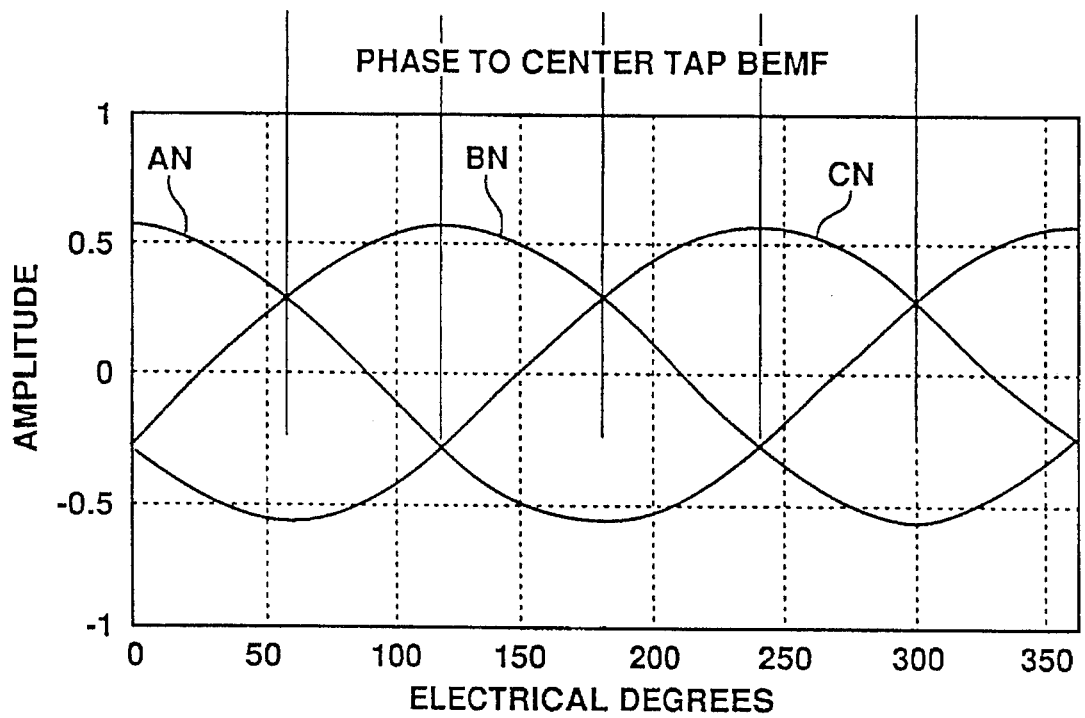
FIG. 3A shows the waveforms corresponding to the phase to center-tap BEMF as a function of electrical degrees (0 to 360 degrees).

The BEMF voltage is proportional to the amount of torque that is produced in motor 201. In other words, when the BEMF voltage is at a peak, the torque is likewise, at a peak. As motor 201 is held in one commutation state and is rotated through 360 degrees, the generated BEMF and torque has a sinusoidal waveform. FIG. 3A shows the waveforms corresponding to the phase to center-tap BEMF as a function of electrical degrees (0 to 360 degrees). It can be seen that the three sinusoidal waveforms AN, BN, and CN correspond to the phase to center-tap BEMF that is generated.

These phase to center-tap waveforms AN, BN, and CN can be transformed to phase to phase waveforms by multiplying by the square root of three (amplitude only). FIG. 3B shows the waveforms corresponding to the phase to phase BEMF as a function of electrical degrees. It can be seen that the six waveforms corresponding to the six commutation states AC, BC, BA, CA, CB, and AB are also sinusoidal. Again, if the motor is held in one commutation state and rotated through 360 electrical degrees, the developed BEMF voltage and torque is sinusoidal. A number of null points 301–307 are defined each time the waveforms cross the baseline (i.e., 0 volts and no torque). Null points can either be stable or unstable. Referring to these waveforms show that the torque goes from a stable null torque location to a positive peak location, then to an unstable null torque followed by a negative peak torque location, and then back to the stable null torque location, etc.

For example, the CA BEMF waveform has an unstable null point at 303. The unstable null point is characterized by the fact that a slight movement to the right of point 303 causes the torque to move to the right, whereas a slight movement to the left of point 303 causes the torque to move to the left. In other words, any slight torque about point 303 tends to push away from the unstable null point 303. A positive peak torque point 308 follows the unstable null point 303. Thereafter, a stable null point 306 is shown. The stable null point 306 is characterized by the fact that a slight movement to the right of point 306 causes the torque to move leftwards back to point 306. Similarly, a slight movement to the left of point 306 causes the torque to move rightwards back to point 306. In other words, any slight torque about point 306 tends to converge back on the stable null point 306. A negative peak torque 309 follows the stable null point 306. The cycle then repeats with the unstable null point 303.

When power is first applied in one of the six commutation states, the motor is in an unknown location. Hence, in the present invention, the three-phase spindle motor is powered on in an initial commutation state. The motor is kept at this initial commutation state for a pre-determined amount of time without advancing to the next commutation state. This allows the motor to align itself to a stable null torque location (e.g., point 306). Once this alignment is complete, the motor is in a known position and commutations are then advanced in a well-known process.

For example, suppose that the initial commutation state upon power-up is AC. This AC commutation state is held for a predetermined period of time. The exact amount of time depends on the particular disk drive's characteristics. In the currently preferred embodiment, a time period of 250 milliseconds is utilized. The spindle motor will probably rotate to its stable null point 303. Given that the spindle motor is at point 303, this corresponds to the desired commutation state BA which is two commutation states ahead of the alignment state. Therefore, after the alignment time interval, the commutation state machine must be immediately advanced two states. The motor stays in commutation state BA from point 310 to point 311 in order to achieve the maximum torque. Once the motor arrives at point 311, the commutation state is switched from BA to CA. The motor is kept at commutation state CA from point 311 to 312. Upon encountering point 312, the motor is switched over to the next commutation state, CB. The motor is then switched to commutation state AB at point 313. Commutation state AC occurs at point 315, and commutation state BC occurs at point 316. Thereafter, the commutation process repeats itself over and over again.

However, there is a possibility that when current is first applied at power-up, the spindle motor is at or near an unstable null point. And due to frictional forces, the motor might not be able to start rotating. Hence, in the present invention, a second alignment procedure is performed to overcome such a predicament. If the motor happens to be near an unstable null point and is unable to move, the present invention advances the motor to the next commutation state. By thusly advancing to the next commutation state, the motor is put near a peak torque position. When the motor is next aligned to a stable null torque location, the commutation state machine (e.g., the processor) immediately advances the motor forward two successive commutation states. This brings the motor to its proper point on the three-phase torque curves.

Once the commutation state machine is aligned to the proper motor position, the motor begins accelerating in the correct direction. As the motor rotates, the commutations are advanced to keep the motor on the peak torque curves. The scheduling of these commutation advancements are based on the applied start current, the corresponding motor acceleration, and the number of motor poles. In the currently preferred embodiment, when the motor reaches five to ten percent of its final speed, the motor's BEMF signal being generated is large enough so as to enable the processor to control the commutation according to well-known processes.

In an alternative embodiment, a third alignment procedure is performed as necessary. If it has been detected that the spindle motor is not rotating even after performing the second alignment procedure, the second alignment procedure is repeated. The advantage for incorporating a third alignment procedure is to assure that the spindle motor does indeed start rotating. However, the disadvantage is that it slows down the overall spin-up process and adds to its complexity.

Figure 4:
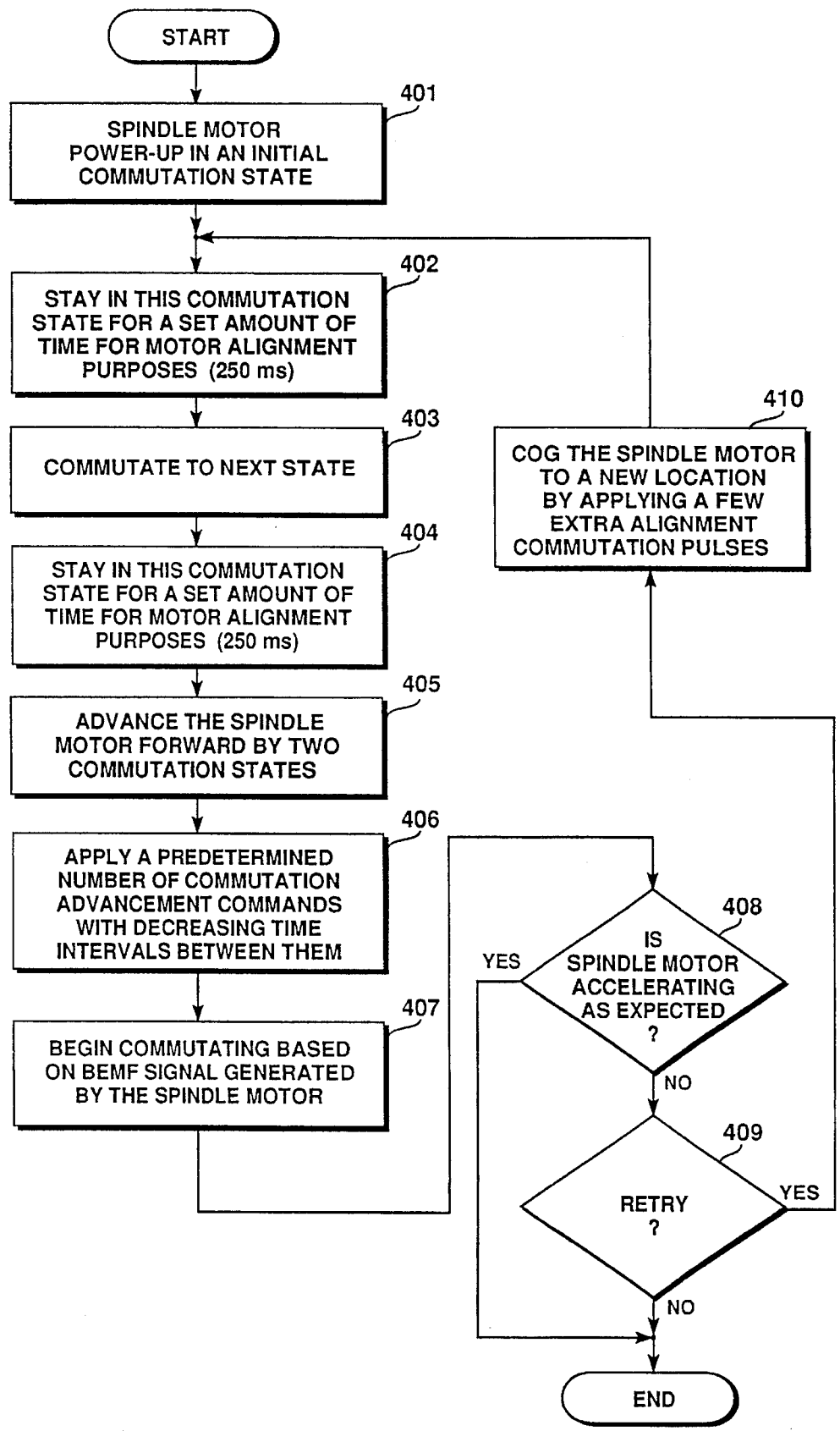
FIG. 4 shows a flowchart describing the steps for starting up the spindle motor of a hard disk drive.

FIG. 4 shows a flowchart describing the steps for starting a spindle motor of a hard disk drive. The spindle motor is powered up in an initial commutation state, step 401. The spindle motor stays in this commutation state for a predetermined amount of time (e.g., 250 milliseconds) for motor alignment purposes, step 402. The spindle motor is then commutated to the next state, step 403. Thereupon, it stays in this commutation state for a predetermined amount of time (e.g., 250 milliseconds) for motor alignment purposes, step 404. Next, the spindle motor is advanced forward by two commutation states, step 405. A predetermined number of commutation advancement states is then applied with decreasing time intervals in-between, step 406.

At this point, commutating begins based on BEMF signals generated by the spindle motor, step 407. A determination is made as to whether the spindle motor is accelerating at an expected rate, step 408. If so, the process is completed. Otherwise, a determination is made as to whether a retry should be executed, step 409. In a retry operation, the spindle motor is cogged to a new location by applying a few extra alignment commutation pulses (e.g., 8), step 410.

Figure 5:
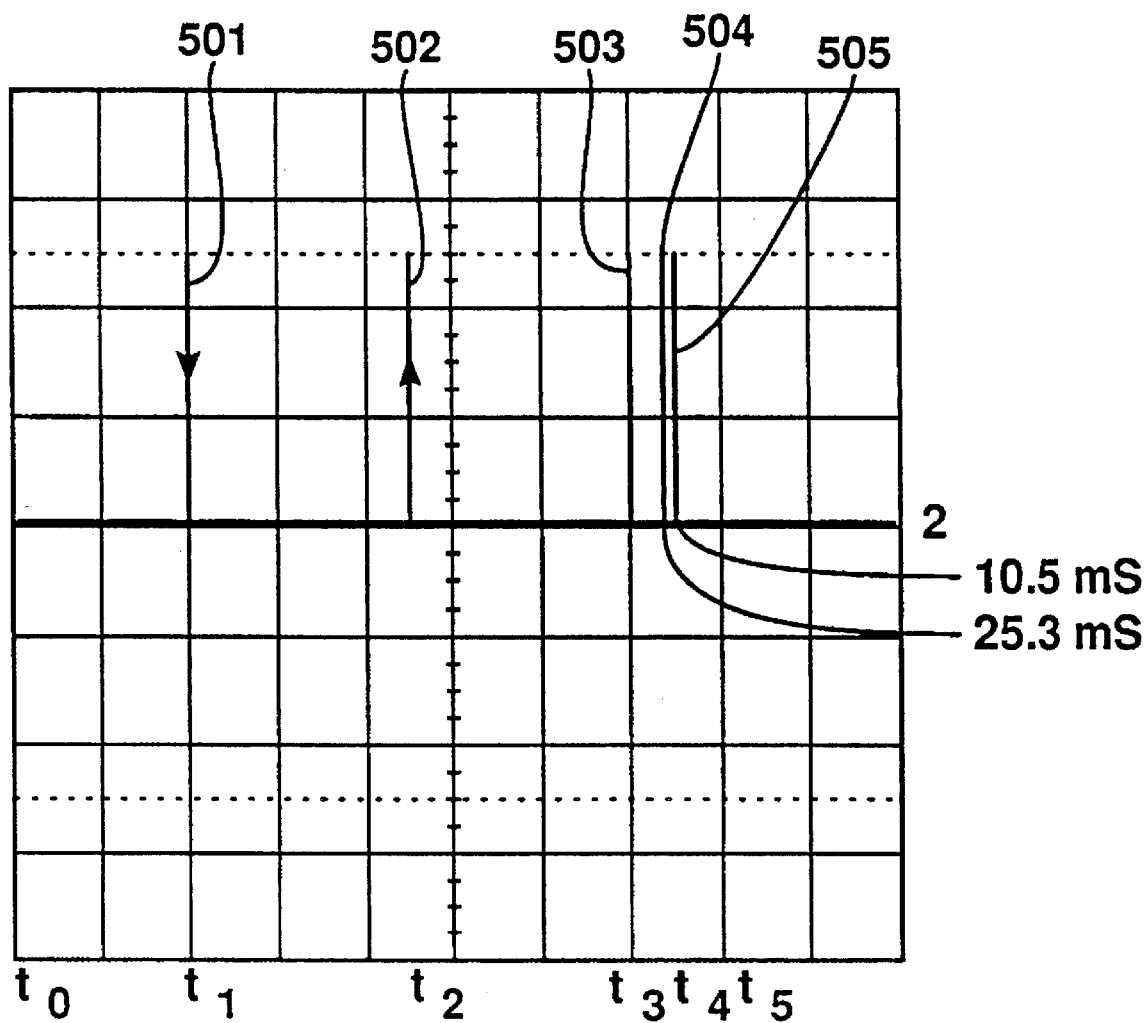
FIG. 5 shows a timing chart of the commutation pulses associated with the spindle start-up process.

FIG. 5 shows a timing chart of the commutation pulses associated with the spindle start-up process. In the currently preferred embodiment, power is applied to the spindle motor at t0. The spindle motor is set to the first commutation state by commutation pulse 501 at time $t_1$. The spindle motor is kept in this first commutation state until time $t_2$. At time $t_2$, a second commutation pulse 502 causes the spindle motor to be advanced to the second commutation state. The spindle motor is kept in the second commutation state until time $t_3$. Thereupon, a third and fourth commutation pulse 503 causes the spindle motor to be advanced to the third and fourth commutation states. Note that 503 is where the two immediate commutation advances occur which begins the acceleration ramp. A short time later, a fifth commutation pulse 504 at time $t_4$, followed by a sixth commutation pulse 505 at time $t_5$, causes the spindle motor to be advance to the fifth and sixth commutation states. After $t_5$, the commutation states are controlled according to the BEMF being generated by the rotating spindle motor. In the currently preferred embodiment, the time from $t_1$ to $t_2$ is approximately 250 milliseconds. The time from $t_2$ to $t_3$ is approximately 250 milliseconds. The time from $t_3$ to $t_4$ is approximately 25.3 milliseconds, and the time from $t_4$ to $t_5$ is approximately 10.5 milliseconds.

Thus, an apparatus and method for the start-up of a spindle motor of a hard disk drive is disclosed.

What is claimed is:

1. A method for starting spin-up of a spindle motor in a hard disk drive, said method comprising the steps of:

initially applying power to said spindle motor;

setting said spindle motor to a first commutation state;

maintaining said spindle motor in said first commutation state for a first pre-determined period of time;

advancing said spindle motor to a second commutation state after said first pre-determined period of time has elapsed;

maintaining said spindle motor in said second commutation state for a second pre-determined period of time;

advancing said spindle motor two successive commutation states after said second pre-determined period of time has elapsed.

2. The method of claim 1 further comprising the steps of:

determining whether said spindle motor hits attained a pre-determined fraction of its final speed;

commutating said spindle motor according to a back electromotive force being generated by said spindle motor once said spindle motor has achieved said predetermined fraction of its final speed.

3. The method of claim 2 further comprising the step of said spindle motor following peak torque curves.

4. The method of claim 1 further comprising the steps of:

determining whether said spindle motor has started spinning;

if said spindle motor has not started spinning:

switching said spindle motor to a third commutation state;

maintaining said spindle motor in said third commutation state for a third predetermined amount of time before performing the step of advancing said spindle motor two successive commutation states.

5. The method of claim 1, wherein said first predetermined period of time is approximately 250 milliseconds.

6. The method of claim 1, wherein said second predetermined period of time is approximately 250 milliseconds.

7. The method of claim 1, wherein said spindle motor is aligned to a stable null point after said first pre-determined period of time has elapsed.

8. The method of claim 1, wherein said spindle motor is a three-phase motor having an AC, BC, BA, CA, CB, and AB commutation states.

9. An apparatus for controlling start-up of a three-phase motor, comprising:

a memory for storing a set of instructions specifying commutations for said three-phase motor;

a processor coupled to said memory and said three-phase motor, said processor controlling said three-phase motor according to said set of instructions stored in said memory, wherein said processor includes:

logic for setting said three-phase motor to a first commutation state and for maintaining said three-phase motor at said first commutation state for a first pre-determined length of time when current is initially applied to said motor;

logic for setting said three-phase motor to a second commutation state and for maintaining said three-phase motor at said second commutation state for a second pre-determined length of time;

logic for advancing said spindle motor two successive commutation states.

10. The apparatus of claim 9 further comprising:

means for determining whether said three-phase motor has attained a pre-determined fraction of its final speed;

a sensor for generating a back EMF signal, wherein said processor commutates said spindle motor according to said back EMF signal when said three-phase motor has achieved said pre-determined fraction of its final speed.

11. The apparatus of claim 10, wherein said processor further comprises logic for switching said three-phase motor to a third commutation state and for maintaining said spindle motor in said third commutation state for a third predetermined length of time.

12. The apparatus of claim 9, wherein said first predetermined length of time is approximately 250 milliseconds.

13. The apparatus of claim 9, wherein said second predetermined length of time is approximately 250 milliseconds.

14. The apparatus of claim 9, wherein said three-phase motor is aligned to a stable null point after said first pre-determined length of time has elapsed.

15. The apparatus of claim 9, wherein said spindle motor is a three-phase motor having an AC, BC, BA, CA, CB, and AB commutation states.

* * * * *